United States Patent
Oki et al.

(10) Patent No.: US 12,059,916 B2
(45) Date of Patent: Aug. 13, 2024

(54) TEXTILE PRINTING METHOD, PRINTED MATTER, AND RECORDING APPARATUS

(71) Applicant: Seiko Epson Corporation, Tokyo (JP)

(72) Inventors: Yasuhiro Oki, Matsumoto (JP);
Yoshitaka Miyajima, Matsumoto (JP);
Daisuke Sakuma, Minowa (JP);
Hiromi Noguchi, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 17/488,480

(22) Filed: Sep. 29, 2021

(65) Prior Publication Data
US 2022/0097435 A1 Mar. 31, 2022

(30) Foreign Application Priority Data

Sep. 30, 2020 (JP) .................................. 2020-164601

(51) Int. Cl.
*B41M 7/00* (2006.01)
*B41J 2/145* (2006.01)
(Continued)

(52) U.S. Cl.
CPC ............ *B41M 7/0018* (2013.01); *B41J 2/145* (2013.01); *B41M 5/0023* (2013.01);
(Continued)

(58) Field of Classification Search
CPC .............. B41M 7/0018; B41M 5/0023; B41M 5/0047; D06P 1/16; D06P 5/30
See application file for complete search history.

(56) References Cited

U.S. PATENT DOCUMENTS

2011/0310166 A1* 12/2011 Namba ................ B41J 2/17553
  206/524.1
2011/0316927 A1* 12/2011 Yamashita ................ D06P 5/30
  347/20
(Continued)

FOREIGN PATENT DOCUMENTS

EP  2405055 A1  1/2012
EP  2537679 A1  12/2012
(Continued)

OTHER PUBLICATIONS

Database WPI Week Feb. 2020, CN-110820369A, 3 pgs.

*Primary Examiner* — Kelly M Gambetta
(74) *Attorney, Agent, or Firm* — Harness, Dickey & Pierce, P.L.C.

(57) ABSTRACT

A textile printing method for printing on a fabric, the fabric being a nonwoven fabric containing synthetic fibers. includes a first adhering step of adhering to the fabric by ejecting a dyeing ink by an ink jet method, and a second adhering step of adhering a non-dyeing ink to the fabric. The dyeing ink contains a disperse dye, a water-soluble organic solvent, and water, and the non-dyeing ink contains a water-soluble organic solvent and water. The water-soluble organic solvent contained in the non-dyeing ink contains a glycol-based organic solvent having a HSP value of 13.6 or more, and the content of the glycol-based organic solvent is 80% by mass or more relative to the total amount of the organic solvent contained in the non-dyeing ink. The adhesion position of the dyeing ink and the adhesion position of the non-dyeing ink are at least partially overlapped each other.

9 Claims, 1 Drawing Sheet

(51) Int. Cl.
B41M 5/00 (2006.01)
D06P 1/16 (2006.01)
D06P 5/30 (2006.01)

(52) U.S. Cl.
CPC ............ B41M 5/0047 (2013.01); D06P 1/16 (2013.01); D06P 5/30 (2013.01)

(56) References Cited

U.S. PATENT DOCUMENTS

| | | | |
|---|---|---|---|
| 2016/0230334 A1* | 8/2016 | Oki | C09D 11/328 |
| 2019/0382606 A1* | 12/2019 | Iraqi | C09D 11/102 |
| 2020/0071553 A1 | 3/2020 | Sakuma et al. | |

FOREIGN PATENT DOCUMENTS

| | | |
|---|---|---|
| EP | 3053972 A1 | 8/2016 |
| EP | 3617284 A1 | 3/2020 |
| JP | H06-041878 A | 2/1994 |
| JP | 2016-010931 A | 1/2016 |
| JP | 2018-127736 A | 8/2018 |
| JP | 2020-033660 A | 3/2020 |
| WO | 2019/106089 A1 | 6/2019 |

* cited by examiner

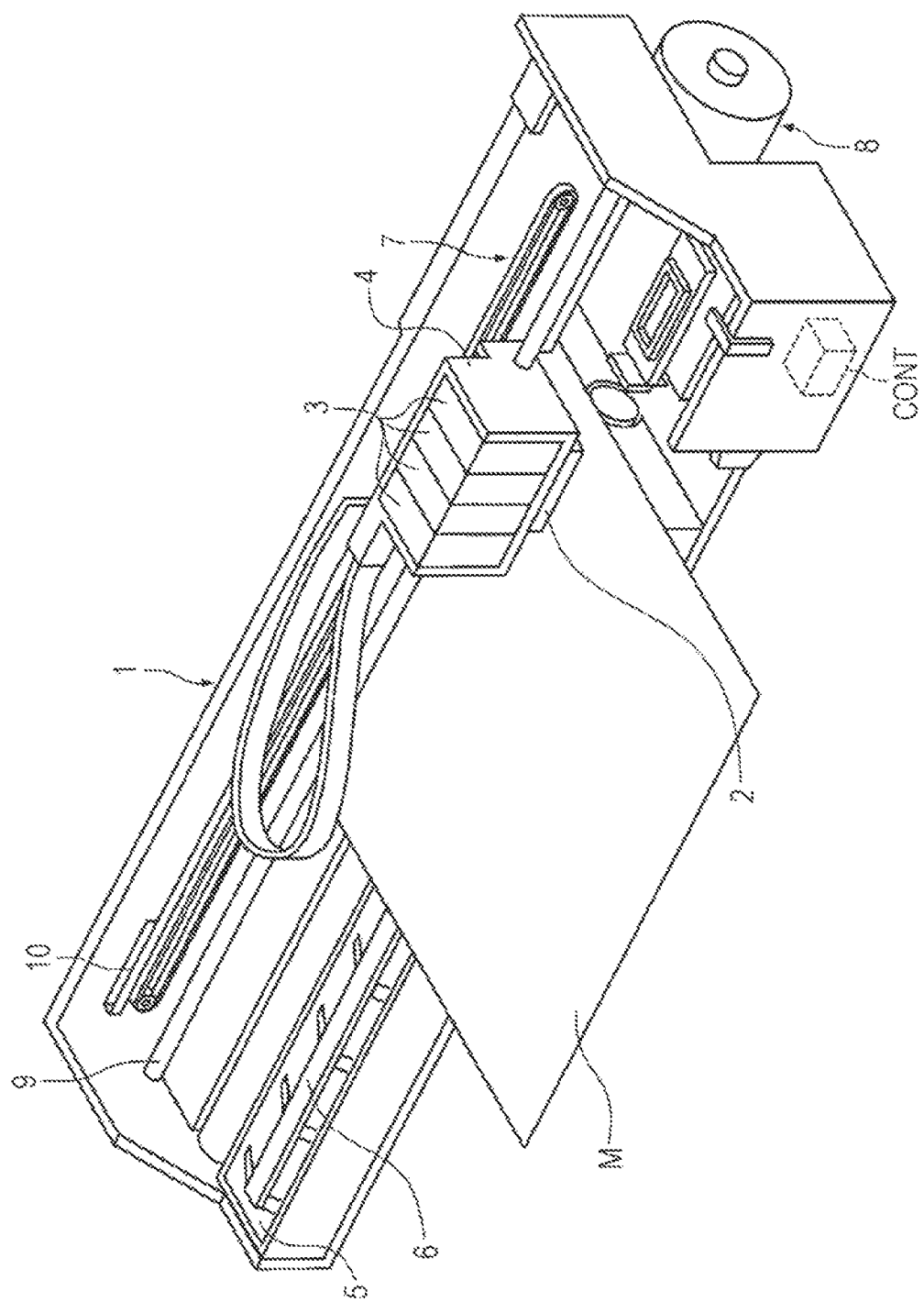

TEXTILE PRINTING METHOD, PRINTED MATTER, AND RECORDING APPARATUS

The present application is based on, and claims priority from JP Application Serial Number 2020-164601, filed Sep. 30, 2020, the disclosure of which is hereby incorporated by reference herein in its entirety.

BACKGROUND

1. Technical Field

The present disclosure relates to a textile printing method, a printed matter, and a recording apparatus.

2. Related Art

Textile printing using an ink jet system has recently been used as a method for recording images on fabrics such as a woven fabric and a knitted fabric, and fabric products such as clothing and the like produced by the textile printing become popularized.

JP-A-2018-127736 discloses an ink jet printed artificial leather having an ink jet printed raised surface. In the artificial leather, in order to decrease a difference in brightness between a surface layer, which contains the ink jet printed raised surface, and a colored inner layer other than the surface layer, an artificial leather substrate containing a nonwoven fabric and a polymer elastic material applied to the inside of the nonwoven fabric is entirely colored in advance.

However, textile printing using an ink jet system for a nonwoven fabric itself has been not much investigated. It has been found that textile printing using an ink jet system for a nonwoven fabric easily causes dyeing unevenness.

SUMMARY

According to an aspect of the present disclosure, a textile printing method for printing on a fabric, which is a nonwoven fabric containing synthetic fibers, includes a first adhering step of adhering to the fabric by ejecting a dyeing ink by an ink jet method, and a second adhering step of adhering a non-dyeing ink to the fabric. The dyeing ink contains a disperse dye, a water-soluble organic solvent, and water, and the non-dyeing ink contains a water-soluble organic solvent and water. The water-soluble organic solvent contained in the non-dyeing ink contains a glycol-based organic solvent having a HSP value of 13.6 or more, and the content of the glycol-based organic solvent is 80% by mass or more relative to the total amount of the organic solvent contained in the non-dyeing ink. The adhesion position of the dyeing ink and the adhesion position of the non-dyeing ink are at least partially overlapped each other.

According to an aspect of the present disclosure, a printed matter includes a printed fabric, the fabric being a nonwoven fabric containing synthetic fibers, and having a recording surface formed by adhering a dyeing ink and a non-dyeing ink to the fabric so as to be overlapped each other. The dyeing ink contains a disperse dye, a water-soluble organic solvent, and water, and the non-dyeing ink contains a water-soluble organic solvent and water. The water-soluble organic solvent contained in the non-dyeing ink contains a glycol-based organic solvent having a HSP value of 13.6 or more, and the content of the glycol-based organic solvent is 80% by mass or more relative to the total amount of the organic solvent contained in the non-dyeing ink.

An aspect of the present disclosure, a recording apparatus used for the textile printing method includes an ink jet heat having a first nozzle, which ejects a dyeing ink, and a second nozzle, which ejects a non-dyeing ink. The dyeing ink contains a disperse dye, a water-soluble organic solvent, and water, and the non-dyeing ink contains a water-soluble organic solvent and water. The water-soluble organic solvent contained in the non-dyeing ink contains a glycol-based organic solvent having a HSP value of 13.6 or more, and the content of the glycol-based organic solvent is 80% by mass or more relative to the total amount of the organic solvent contained in the non-dyeing ink.

BRIEF DESCRIPTION OF THE DRAWING

FIGURE is a drawing showing an example of a recording apparatus used in an embodiment of the present disclosure.

DESCRIPTION OF EXEMPLARY EMBODIMENTS

An embodiment of the present disclosure (referred to as a "present embodiment" hereinafter) is described in detail below with reference to the drawing according to demand, but the present disclosure is not limited to this. In addition, vertical and horizontal positional relations are based on the positional relations shown in the drawing unless otherwise specified. Further, the dimensional ratios shown in the drawing are not limited to the ratios shown in the drawing.

1. Textile Printing Method

A textile printing method according to a present embodiment is a textile printing method for printing on a fabric, which is a nonwoven fabric containing synthetic fibers, the method including a first adhering step of adhering to the fabric by ejecting a predetermined dyeing ink by an ink jet method, and a second adhering step of adhering a predetermined non-dyeing ink to the fabric.

A nonwoven fabric generally has larger gaps between fibers than those in a woven fabric. Therefore, dyeing of a pattern by fiber dyeing with a dye is difficult, and dyeing unevenness and white background remaining easily occur (also together referred to as "dyeing unevenness" hereinafter). Also, a nonwoven fabric generally has thickness, and thus dyeing in the direction with a sufficient thickness by an ink jet method is difficult and easily causes dyeing unevenness and white background remaining. In particular, a disperse dye is used for dyeing synthetic fibers such as polyester fibers or the like, but it is more difficult to suppress dyeing unevenness because the disperse dye is hardly permeated in the thickness direction. Further, fibers of a nonwoven fabric are shorter than of those of a woven fabric, and thus the fibers easily drop off, thereby easily causing color loss and color omission, and causing poor durability. Therefore, a nonwoven fabric is not necessarily suitable for application of ink jet dyeing.

On the other hand, when a pigment is used in place of a dye, dyeing unevenness hardly occurs because the surface of a nonwoven fabric is coated with the pigment, but texture (tactility) originally possessed by fibers is lost.

On the other hand, the present embodiment uses the predetermined non-dyeing ink having an adjusted balance between hydrophilicity and hydrophobicity, and thus a disperse dye can be uniformly permeated into the fabric even when a nonwoven fabric containing synthetic fibers is dyed. Thus, dyeing unevenness can be suppressed, and also the durability of a printed matter can be improved.

Also, as described later, when a plurality of color inks are used or when an ink containing a plurality of disperse dyes is used, color separation may occur due to a difference in solvent solubility between the disperse dyes according to the solvent used for permeation, particularly, when a nonwoven fabric is dyed. However, such color separation can be suppressed by using the non-dyeing ink of the present embodiment containing the predetermined water-soluble organic solvent. The configuration of the textile printing method according to the embodiment of the present disclosure is described in detail below.

1.1. First Adhering Step

The textile printing method according to the present embodiment includes the first adhering step of adhering to the fabric by ejecting the dyeing ink by an ink jet method, and the second adhering step of adhering the non-dyeing ink to the fabric. The dyeing ink and the non-dyeing ink are adhered to the fabric so that the adhesion position of the dyeing ink and the adhesion position of the non-dyeing ink are at least partially overlapped each other.

In the first adhering step, the ink can be ejected by the ink jet method using a known ink jet recording apparatus. The ejection method is not particularly limited, but for example, a piezo system, a system of ejecting the ink using the bubbles generated by heating the ink, or the like can be used.

Either the first adhering step or the second adhering step may be first performed, and the non-dyeing ink may be adhered to the fabric to which the dyeing ink has been adhered, the dyeing ink may be adhered to the fabric to which the non-dyeing ink has been adhered, or both inks may be adhered at the same time. In addition, the dyeing ink may be first adhered to the fabric to which the non-dyeing ink has been adhered, and then the non-dyeing ink may be further adhered.

In the first adhering step, the amount of the dyeing ink adhered to the fabric is preferably 0.1 to 1.5 mg/cm$^2$, more preferably 0.2 to 1.0 mg/cm$^2$, and still more preferably 0.3 to 0.8 mg/cm$^2$. With the amount of the dyeing ink adhered within the range described above, there is a tendency to improve color development of an image, suppress dyeing unevenness, and more improve durability. In addition, particularly when the amount of the dyeing ink adhered is 0.4 to 0.8 mg/cm$^2$, there is a tendency to satisfactorily suppress dyeing unevenness and color separation and to more improve durability.

Also, the textile printing method of the present embodiment may use two or more types of inks containing different coloring materials as the dyeing ink. This configuration is not particularly limited as long as the inks have hues different from each other. For example, a configuration uses, as the dyeing ink, two or more inks selected from the group consisting of a yellow ink, a magenta ink, a red ink, a cyan ink, a blue in, and an orange ink.

For example, when a cyan ink and a magenta ink are adhered to a fabric to form a secondary color, such as violet, on the fabric, even when a water-soluble organic solvent is simply adhered for the purpose of permeating the disperse dye, a difference in permeability may occur due to a difference in solvent solubility or solvent affinity, thereby causing color separation on a nonwoven fabric. In addition, because the nonwoven fabric has the large gaps between fibers and large variation in gaps, a difference in permeability easily occurs, and thus color separation may easily occur. However, when the non-dyeing ink of the present embodiment containing the predetermined water-soluble organic solvent is used as described later, dyeing unevenness can be suppressed, and color separation can also be suppressed. Therefore, the present disclosure is particularly useful for a recording method in which a plurality of inks are adhered to a fabric to mix colors on the fabric.

1.1.1. Fabric

The fabric is a nonwoven fabric containing synthetic fibers. Examples of the synthetic fibers constituting the nonwoven fabric include, but are not particularly limited to, thermoplastic synthetic fibers such as polypropylene, polyester, acetate, triacetate, polyamide, polyurethane, and the like. Among these, polyester, acetate, and polyamide are preferred, and polyester is more preferred. The synthetic fibers may be mixed fibers composed of a combination of plural types of thermoplastic synthetic fibers. In addition, the fabric used in the present embodiment is not particularly limited as long as it contains synthetic fibers, and it may be a nonwoven fabric produced by mixing natural fiber, such as cotton, hemp, wool, silk, or the like, or biodegradable fibers, such as polylactic acid or the like, with synthetic fibers. The nonwoven fabric may also be a nonwoven fabric composed of a fiber layer containing synthetic fibers.

The METSUKE of the fabric is preferably 30 to 300 g/m$^2$, more preferably 40 to 150 g/m$^2$, and still more preferably 50 to 120 g/m$^2$ or less. When the METSUKE of the fabric is within the range described above, a printed matter with little dyeing unevenness is hardly obtained because the thickness and fiber density of the fabric increase or decrease. Thus, the present disclosure is particularly useful.

In addition, the thickness of the fabric is preferably 150 to 1000 μm, more preferably 200 to 500 μm, and still more preferably 250 to 400 μm. When the thickness of the fabric is within the range described above, a printed matter with little dyeing unevenness is hardly obtained because the disperse dye is hardly permeated. Thus, the present disclosure is particularly useful.

The nonwoven fabric containing synthetic fibers is not particularly limited, but a nonwoven fabric produced by a spun bonding method or a water jet method can be used. Such a nonwoven fabric may be an artificial leather. A commercial product may be used as the nonwoven fabric, and examples thereof include Ecule (registered trade name of Toyobo Co., Ltd.) product Nos. 3A01A, 3501A, 3601A, 3701A, and 3501AD (above embossed polyester long fiber nonwoven fabrics, manufactured by Toyobo Spunbond Inc.), diamond spunlace extra-fine polyester-type WO-FE (above product name, manufactured by Mitsubishi Paper Mills Limited), Ultrasuede (registered trade name of Toray Industries, Inc.), Alcantara (registered trade name of ALCANTARA S. p. A.) (above product name manufactured by Toray Industries, Inc.), and Lamous (registered trade name of Asahi Kasei Corporation) (above product name, manufactured by Asahi Kasei Corporation).

1.1.2. Dyeing Ink

The dyeing ink contains the disperse dye, the water-soluble organic solvent, and water, and if required, it may contain a surfactant and other additives.

1.1.2.1. Disperse Dye

The disperse dye is a nonionic dye generally having a hydrophilic group and a moderate polar group without having an anionic ionized group, and is preferably used for printing synthetic fibers such as polyester, nylon, acetate, and the like.

Examples of the disperse dye include, but are not particularly limited to, C. I. Disperse Yellow 3, 4, 5, 7, 9, 13, 23, 24, 30, 33, 34, 42, 44, 49, 50, 51, 54, 56, 58, 60, 63, 64, 66, 68, 71, 74, 76, 79, 82, 83, 85, 86, 88, 90, 91, 93, 98, 99, 100, 104, 108, 114, 116, 118, 119, 122, 124, 126, 135, 140, 141, 149, 160, 162, 163, 164, 165, 179, 180, 182, 183, 184, 186, 192, 198, 199, 202, 204, 210, 211, 215, 216, 218, 224, 227, 231, and 232; C. I. Disperse Orange 1, 3, 5, 7, 11, 13, 17, 20, 21, 25, 29, 30, 31, 32, 33, 37, 38, 42, 43, 44, 45, 46, 47, 48, 49, 50, 53, 54, 55, 56, 57, 58, 59, 61, 66, 71, 73, 76, 78, 80, 89, 90, 91, 93, 96, 97, 119, 127, 130, 139, and 142; C. I. Disperse Red 1, 4, 5, 7, 11, 12, 13, 15, 17, 27, 43, 44, 50, 52, 53, 54, 55, 56, 58, 59, 60, 65, 72, 73, 74, 75, 76, 78, 81, 82, 86, 88, 90, 91, 92, 93, 96, 103, 105, 106, 107, 108, 110, 111, 113, 117, 118, 121, 122, 126, 127, 128, 131, 132, 134, 135, 137, 143, 145, 146, 151, 152, 153, 154, 157, 159, 164, 167, 169, 177, 179, 181, 183, 184, 185, 188, 189, 190, 191, 192, 200, 201, 202, 203, 205, 206, 207, 210, 221, 224, 225, 227, 229, 239, 240, 257, 258, 277, 278, 279, 281, 288, 298, 302, 303, 310, 311, 312, 320, 324, and 328; C. I. Disperse Violet 1, 4, 8, 23, 26, 27, 28, 31, 33, 35, 36, 38, 40, 43, 46, 48, 50, 51, 52, 56, 57, 59, 61, 63, 69, and 77; C. I. Disperse Green 9; C. I. Disperse Brown 1, 2, 4, 9, 13, and 19; C. I. Disperse Blue 3, 7, 9, 14, 16, 19, 20, 26, 27, 35, 43, 44, 54, 55, 56, 58, 60, 62, 64, 71, 72, 73, 75, 79, 81, 82, 83, 87, 91, 93, 94, 95, 96, 102, 106, 108, 112, 113, 115, 118, 120, 122, 125, 128, 130, 139, 141, 142, 143, 146, 148, 149, 153, 154, 158, 165, 167, 171, 173, 174, 176, 181, 183, 185, 186, 187, 189, 197, 198, 200, 201, 205, 207, 211, 214, 224, 225, 257, 259, 267, 268, 270, 284, 285, 287, 288, 291, 293, 295, 297, 301, 315, 330, 333, 359, and 360; and C. I. Disperse Black 1, 3, 10, and 24.

These disperse dyes contained in the dyeing ink may be used alone or in combination of two or more. When the dyeing ink contains two or more disperse dyes, the dyeing ink having a desired color tone can be prepared. For example, a black ink may be prepared by combining disperse blue, disperse yellow, and disperse red, and an orange ink may be prepared by combining disperse yellow and disperse red.

For example, when a black ink is prepared by combining disperse blue, disperse yellow, and disperse red, and is adhered to a fabric, even when the water-soluble organic solvent is simply adhered for the purpose of permeating the disperse dyes, color separation may occur on a nonwoven fabric due to a difference in solvent solubility. However, when the non-dyeing ink of the present embodiment containing the predetermined water-soluble organic solvent is used as described later, dyeing unevenness can be suppressed, and also the color separation can be suppressed. Thus, the present disclosure is particularly useful for a recording method in which the dyeing ink containing a plurality of disperse dyes is adhered to a fabric.

The content of the disperse dye depends on the color tone of the ink prepared, but the content relative to the total amount of the dyeing ink is preferably 0.5% to 10% by mass, more preferably 1.0% to 8.5% by mass, and still more preferably 2.0% to 7.0% by mass. When the content of the disperse dye is within the range described above, there is a tendency to suppress dyeing unevenness and to more improve durability.

1.1.2.2. Water-Soluble Organic Solvent

Examples of the water-soluble organic solvent include, but are not particularly limited to, glycol-based organic solvents such as glycerin, ethylene glycol, diethylene glycol, triethylene glycol, propylene glycol, dipropylene glycol, 1,2-propanediol, 1,3-propanediol, 1,2-butanediol, 1,3-butanediol, 1,2-pentanediol, 1,2-hexanediol, 1,4-butanediol, 1,5-pentanediol, 1,6-hexanediol, and the like; glycol ether-based organic solvents such as ethylene glycol monomethyl ether, ethylene glycol monoethyl ether, diethylene glycol monomethyl ether, diethylene glycol monoethyl ether, propylene glycol monomethyl ether, propylene glycol monoethyl ether, dipropylene glycol monomethyl ether, dipropylene glycol monoethyl ether, triethylene glycol monomethyl ether, and the like; nitrogen-containing organic solvents such as 2-pyrrolidone, N-methyl-2-pyrrolidone, N-ethyl-2-pyrrolidone, and the like; and alcohol-based organic solvents such as methanol, ethanol, n-propyl alcohol, isopropyl alcohol, n-butanol, 2-butanol, tert-butanol, isobutanol, n-pentanol, 2-pentanol, 3-pentanol, tert-pentanol, and the like. The water-soluble organic solvents may be used alone or in combination of two or more.

Among these, the glycol-based organic solvents are preferred, and glycerin, 1,2-propanediol, and 1,3-butanediol are more preferred. The use of such a water-soluble organic solvent tends to suppress dyeing unevenness and color separation and to more improve durability.

In the present embodiment, the glycol-based organic solvents include polyhydric alcohols such as triol, such as glycerin, and tetraol, such as 1,2,3,4-butanetetrol.

The content of the water-soluble organic solvent relative to the total amount of the dyeing ink is preferably 25% to 55% by mass, more preferably 30% to 50% by mass, and still more preferably 35% to 45% by mass. When the content of the water-soluble organic solvent is within the range described above, there is a tendency to suppress dyeing unevenness and color separation and to more improve durability.

1.1.2.3. Water

The content of water relative to the total amount of the dyeing ink is preferably 30% to 60% by mass, more preferably 35% to 55% by mass, and still more preferably 40% to 50% by mass. When the content of water is within the range described above, there is a tendency to suppress dyeing unevenness and color separation and to more improve durability.

1.1.2.4. Surfactant

Examples of the surfactant include, but are not particularly limited to, an anionic surfactant, a cationic surfactant, and a nonionic surfactant. These surfactants may be used alone or in combination of two or more.

Examples of the anionic surfactant include, but are not particularly limited to, alkylsulfocarboxylate salts, alkyl diphenyl ether disulfonate salts, α-olefin sulfonate salts, polyoxyethylene alkyl ether acetate salts, N-acylaminoacid and salts thereof, N-acryl methyl taurine salts, alkylsulfate salt polyoxyalkyl ether sulfate salts, alkylsulfate salt polyoxyethylene alkyl ether phosphate salts, rosin acid soap, caster oil sulfate ester salts, lauryl alcohol sulfate ester salts, alkylphenol-type phosphate esters, alkyl-type phosphate esters, alkylarylsulfonate salts, diethylsulfosuccinate salts, diethylhexylsulfosuccinate salts, dioctylsulfosuccinate salts, and the like. Among these, alkyl diphenyl ether disulfonate salts are more preferred in view of improving dispersion stability of the disperse dye.

Examples of the cationic surfactant include, but are not particularly limited to, primary, secondary, and tertiary amine salt compounds, alkylamine salts, dialkylamine salts, aliphatic amine salt, benzalkonium salts, quaternary ammonium salts, quaternary alkyl ammonium salts, alkylpyridinium salts, sulfonium salts, phosphonium salts, onium salts, imidazolinium salts, and the like.

Examples of the nonionic surfactant include, but are not particularly limited to, an acetylene glycol-based surfactant, a silicone-based surfactant, a polyoxyethylene alkyl ether-based surfactant, a polyoxypropylene alkyl ether-based surfactant, a polycyclic phenyl ether-based surfactant, sorbitan derivatives, and a fluorine-based surfactant. Among these, an acetylene glycol-based surfactant, a silicone-based surfactant, and a fluorine-based surfactant are preferred.

The acetylene glycol-based surfactant is not particularly limited, but is, for example, preferably one or more selected from 2,4,7,9-tetramethyl-5-decyne-4,7-dol, alkylene oxide adducts of 2,4,7,9-tetramethyl-5-decyne-4,7-diol, 2,4-dimethyl-5-decyne-4-ol, and alkylene oxide adducts of 2,4-dimethgl-5-decyne-4-ol.

Examples of the fluorine-based surfactant include, but are not particularly limited to, perfluoroalkylsulfonate salts, perfluoroalkylcarboxylate salts, perfluoroalkylphosphate esters, perfluoroalkylethylene oxide adducts, perfluoroalkylbetaine, and perfluoroalkylamine oxide compounds.

Examples of the silicone-based surfactant include a polysiloxane-based compound, polyether-modified organosiloxane, and the like.

Among these, the anionic surfactant is preferred, and alkyl diphenyl ether disulfonate salts such as sodium dodecyl diphenyl ether disulfonate and the like are more preferred. By using such a surfactant, the dispersion stability of the disperse dye can be more improved, thereby enabling satisfactory dyeing. There is also a tendency to suppress dyeing unevenness and color separation and to more improve durability.

The content of the surfactant relative to the total amount of the dyeing ink is preferably 0.1% to 3.5% by mass, more preferably 0.1% to 2.5% by mass, and still more preferably 0.5% to 1.5% by mass. When the content of the surfactant is within the range described above, there is a tendency to suppress dyeing unevenness and color separation and to more improve durability.

1.1.2.5. Other Additives

If required, the dyeing ink may further contain various additives which can be used in usual inks, such as an anti-mold agent, an antiseptic agent (for example, Proxel manufactured by Avecia Inc.), an antioxidant, an ultraviolet absorber, a chelating agent (for example, sodium ethylenediamine tetraacetate), an oxygen absorber, a pH adjuster (for example, triethanolamine, adipic acid, or potassium hydroxide), a solubilizer, and others. These additives may be used alone or in combination of two or more.

1.2. Second Adhering Step

The second adhering step is a step of adhering the non-dyeing ink to the fabric. In the textile printing method, the dyeing ink and the non-dyeing ink are adhered to the fabric so that the adhesion position of the dyeing ink and the adhesion position of the non-dyeing ink are at least partially overlapped each other.

The method for adhering the non-dyeing ink to the fabric in the second adhering step is not particularly limited, but for example, roller coating, spray coating, or the like other than the ink jet method may be used. Among these, the ink jet method is preferred in view of the ability of highly-precise control of the adhesion position and adhesion amount of the non-dyeing ink. By using this method, the adhesion amounts of the dyeing ink and the non-dyeing ink described later can be easily adjusted, and thus a printed matter having more suppressed dyeing unevenness and color separation can be obtained.

In the second adhering step, the amount of the non-dyeing ink adhered to the fabric is preferably 0.1 to 1.5 mg/cm$^2$, more preferably 0.3 to 1.0 mg/cm$^2$, and still more preferably 0.4 to 0.8 mg/cm$^2$. The amount of the dyeing ink adhered within the range described above tends to improve color development of an image, to suppress dyeing unevenness, and to more improve durability.

In the present embodiment, the dyeing ink and the non-dyeing ink are adhered to the fabric so that the adhesion position of the dyeing ink and the adhesion position of the non-dyeing ink are at least partially overlapped each other. In a region where the dyeing ink and the non-dyeing ink are adhered to be overlapped each other, the amount of the non-dyeing ink adhered relative to 100% by volume of the amount of the dyeing ink adhered is preferably 10% to 400% by volume, more preferably 50% to 300% by volume, and still more preferably 50% to 200% by volume. When the amount of the non-dyeing ink adhered is within the range described above, there is a tendency to suppress dyeing unevenness and color separation and to more improve durability. In particular, from the viewpoint of more improving durability, the amount of the non-dyeing ink adhered relative to 100% by volume of the amount of the dyeing ink adhered is preferably 100% to 500% by volume, more preferably 200% to 400% by volume, and still more preferably 300% to 400% by volume.

1.2.1. Non-Dyeing Ink

The non-dyeing ink contains the predetermined water-soluble organic solvent and water, and if required, it may contain a surfactant, urea, and other additives.

In the present embodiment, the term "non-dyeing ink" represents an ink used for promoting permeation of the dyeing ink to the fabric, but not an ink used for dyeing. From this viewpoint, the content of the coloring material contained in the non-dyeing ink relative to the total amount of the non-dyeing ink is preferably 0.2% by mass or less. The lower limit of the content of the coloring material is not limited, but may be preferably 0% by mass.

1.2.1.1. Water-Soluble Organic Solvent

The water-soluble organic solvent contained in the non-dyeing ink contains a glycol-based organic solvent having a HSP value of 13.6 or more, and the content of the glycol-based organic solvent relative to the total amount of organic solvent contained in the non-dyeing ink is 80% by mass or more. By using the non-dyeing ink containing the water-soluble organic solvent described above, the disperse dye contained in the dyeing ink can be permeated to a nonwoven fabric without being unnecessarily dissolved, thereby suppressing dyeing unevenness and color separation and more improving durability.

More specifically, the disperse dye contained in the dyeing ink is generally a hydrophobic dye, and thus has a tendency that it is hardly dissolved in water and a hydrophilic solvent while it is easily dissolved in a hydrophobic solvent. Thus, by using a hydrophobic solvent, the disperse dye is dissolved and thus is hardly fixed to a nonwoven fabric, thereby failing to obtain good color development. In addition, when two or more disperse dyes are mixed to form a color of black or the like, color separation may occur on the nonwoven fabric due to a difference in solvent solubility between the dyes mixed. Therefore, from the viewpoint of adjusting a balance between hydrophilicity and hydrophobicity, by using the non-dyeing ink containing the predetermined water-soluble organic solvent satisfying the conditions described above, the disperse dyes can be permeated to the nonwoven fabric without being unnecessarily dissolved, thereby suppressing dyeing unevenness and color separation and more improving durability.

From this viewpoint, the water-soluble organic solvent contained in the non-dyeing ink contains the glycol-based organic solvent having a HSP value of 13.6 or more. Examples of the water-soluble organic solvent contained in the non-dyeing ink include, but are not particularly limited to, but examples thereof include the same examples as described above for the water-soluble organic solvent of the dyeing ink.

In particular, examples of the glycol-based organic solvent having a HSP vale of 13.6 or more include, but are not particularly limited to, ethylene glycol (HSP value; 16.1), diethylene glycol (HSP value; 13.7), 1,3-propanediol (HSP value; 15.5), 1,3-butanediol (HSP value; 13.6), 1,2-propanediol (HSP value; 14.2), 1,4-butanediol (HSP value; 14.1), 2-butyn-1,4-diol (HSP value; 15.1), trimethylolpropane (HSP value; 14.1), 1,2,3-butanetriol (HSP value; 15.2), 1,2,3,4-butanetetrol (HSP value; 17.8), and the like.

Among these, ethylene glycol, diethylene glycol, 1,3-butanediol, 1,2-propanediol, and 1,2,3,4-butanetetrol are preferred. The use of such a water-soluble organic solvent tends to suppress dyeing unevenness and color separation and to more improve durability.

The HSP value of the glycol-based organic solvent is 13.6 or more, preferably 13.6 to 17.0, and more preferably 13.6 to 16.5. The HSP value of 13.6 or more causes higher hydrophilicity, and thus the disperse dye can be permeated to the nonwoven fabric without being dissolved, thereby suppressing dyeing unevenness and color separation and more improving durability. Also, the HSP value of 17.0 or less tends to more improve permeability to a nonwoven fabric.

Herein, the HSP value represents a Hansen three-dimensional solubility parameter value represented by mathematical formula (1) below. The unit is not shown below, but the unit is $(cal/cm^3)^{0.5}$. The HSP value can be determined by, for example, calculation using the mathematical formula (1) with reference to the numerical values of $\delta_D$, $\delta_P$, and $\delta_H$ from the database in International Chemical Identifier.

$$\text{HSP value} = (\delta_D^2 + \delta_P^2 + \delta_H^2)^{0.5}/4.1868^{0.5} \quad (1)$$

Dispersion item $\delta_D$: energy due to intermolecular dispersion force
Polar item $\delta_P$: energy due to intermolecular dipolar interaction
Hydrogen bond item $\delta_H$: energy due to intermolecular hydrogen bond The standard boiling point of the glycol-based organic solvent is preferably 243° C. or less, more preferably 170° C. to 240° C., and still more preferably 180° C. to 230° C., and even still more preferably 185° C. to 220° C. When the standard boiling point of the glycol-based organic solvent is 243° C. or less, water is first evaporated and scattered on the fabric to form an organic solvent-rich state on the fabric, and thus proceeding of dissolution of the disperse dye can be suppressed. This tends to suppress dyeing unevenness and color separation and to more improve durability.

The content of the glycol-based organic solvent having a HSP value of 13.6 or more relative to the total amount of the organic solvent contained in the non-dyeing ink is 80% by mass or more, preferably 85% to 100% by mass, more preferably 90% to 100% by mass, still more preferably 95% to 100% by mass, and even still more preferably 97% to 100% by mass. When the content of the glycol-based organic solvent having a HSP value of 13.6 or more is 80% by mass or more, dyeing unevenness and color separation are suppressed, and durability is more improved.

The content of the glycol-based organic solvent having a HSP value of 13.6 or more relative to the total amount of the non-dyeing ink is preferably 20% to 50% by mass, more preferably 25% to 45% by mass, and still more preferably 30% to 40% by mass. When the content of the glycol-based organic solvent having a HSP value of 13.6 or more is within the range described above, dyeing unevenness and color separation are suppressed, and durability is more improved.

In addition, an organic solvent (also referred to as the "other organic solvent" hereinafter) other than the glycol-based organic solvent having a HSP value of 13.6 or more is not particularly limited, but examples thereof include the same examples as those of the water-soluble organic solvent described above for the dyeing ink, excluding the glycol-based organic solvents having a HSP value of 13.6 or more. Examples of the other organic solvent include, but are not particularly limited to, glycol-based organic solvents having a HSP value of less than 13.6, such as triethylene glycol and the like, and nitrogen-containing organic solvents such as 2-pyrrolidone and the like.

The content of the other organic solvent relative to the total amount of the organic solvent contained in the non-dyeing ink is 20% by mass or less, preferably 0% to 15% by mass, more preferably 0% to 10% by mass, still more preferably 0% to 5% by mass, and even still more preferably 0% to 3% by mass.

The total content of the water-soluble organic solvents relative to the total amount of the non-dyeing ink is preferably 25% to 50% by mass, more preferably 30% to 45% by mass, and still more preferably 35% to 40% by mass. When the content of the water-soluble organic solvent is within the range described above, dyeing unevenness and color separation are suppressed, and durability is more improved.

1.2.1.2. Water

The content of the water relative to the total amount of the non-dyeing ink is preferably 35% to 65% by mass, more preferably 40% to 60% by mass, and still more preferably 45% to 55% by mass. The water content within the range described above suppresses dyeing unevenness and color separation and more improves durability.

1.2.1.3. Surfactant

Examples of the surfactant contained in the non-dyeing ink include, but are not particularly limited to, the same examples as those of the surfactant described above for the dyeing ink. Among these, the nonionic surfactant is preferred, and the acetylene glycol-based surfactant is more preferred. In particular, when the surfactant contained in the dyeing ink is the anionic surfactant and the surfactant contained in the non-dyeing ink is the nonionic surfactant, permeability of the disperse dye can be improved while dispersion stability is improved. Thus, there is a tendency to suppress dyeing unevenness and color separation and to more improve durability.

The content of the surfactant relative to the total amount of the non-dyeing ink is preferably 0.1% to 1.5% by mass, more preferably 0.1% to 0.75% by mass, and still more preferably 0.2% to 0.5% by mass. When the content of the surfactant is within the range described above, there is a tendency to suppress dyeing unevenness and color separation and more improve durability.

1.2.1.4. Urea

The non-dyeing ink used in the present embodiment preferably contains urea. Examples of the urea include, but are not particularly limited to, urea, thiourea, ethylene urea, 1,3-dimethylimidazolidinone derivative, and the like. The use of urea tends to, due to its heat insulation effect or the like, suppress dyeing unevenness and color separation and to more improve durability.

The content of the urea relative to the total amount of the non-dyeing ink is preferably 1% to 25% by mass, more preferably 3% to 20% by mass, and still more preferably 5% to 15% by mass. When the content of the urea is within the range described above, there is a tendency to suppress dyeing unevenness and color separation and more improve durability.

1.2.1.5. Other Additives

If required, the non-dyeing ink may contain various additives which can be used in usual inks, such as an anti-mold agent, an antiseptic agent (for example, Proxel manufactured by Avecia Inc.), an antioxidant, an ultraviolet absorber, a chelating agent (for example, sodium ethylenediamine tetraacetate), an oxygen absorber, a pH adjuster (for example, triethanolamine, adipic acid, or potassium hydroxide), a solubilizer, and others. These additives may be used alone or in combination of two or more.

1.3. Fixing Step

The textile printing method of the present embodiment may include a fixing step of fixing the disperse dye adhered to the fabric. Specifically, the fixing step is a heat treatment step of applying at least either heat or steam to the fabric obtained by a color ink adhering step. In this step, the fibers of the fabric are dyed with the disperse dye in the ink.

The heat treatment step can be performed by using a usual known method, and for example, a heating mechanism 6 shown in FIGURE can be used. Examples of a mechanism other than this heating mechanism include a heat pressing method, a normal-pressure steam method, a high-pressure steam method, a hot-air drying method, a thermofixing method, and the like.

From the viewpoint of more satisfactorily dying the fibers constituting the fabric with a dye, the temperature in the fixing step, that is, the attainment temperature of the fabric, is preferably within a range of 90° C. or more and 110° C. or less for natural fibers of cotton or the like and synthetic fibers of polyamide and the like, and is preferably within a range of 160° C. or more and 170° C. or less for synthetic fiber of polyester and the like.

1.4. Washing Step

The textile printing method of the present embodiment may include a washing step of washing the printed matter. The washing step is performed after the fixing step, and the purpose thereof is to remove the dye not adhered to the fibers. The washing step can be performed by, for example, using water or hot water, and if required, plural times of washing or soaping treatment may be performed.

2. Printed Matter

A printed matter of a present embodiment is a printed matter produced by printing a fabric, which is a nonwoven fabric containing synthetic fibers and has a recording surface formed by adhering a dyeing ink and a non-dyeing ink to the fabric so as to be overlapped each other. The dyeing ink contains a disperse dye, a water-soluble organic solvent, and water, and the non-dyeing ink contains a water-soluble organic solvent and water. The water-soluble organic solvent contained in the non-dyeing ink contains a glycol-based organic solvent having a HSP value of 13.6 or more, and the content of the glycol-based organic solvent is 80% by mass or more relative to the total amount of the organic solvent contained in the non-dyeing ink.

The printed matter can be obtained by the textile printing method described above, and has suppressed dyeing unevenness and color separation and more improved durability. The nonwoven fabric, the dyeing ink, and the non-dyeing ink are as described above.

3. Recording Apparatus

A recording apparatus according to a present embodiment is a recording apparatus used for the textile printing method and includes an ink jet heat having a first nozzle, which ejects a dyeing ink, and a second nozzle, which ejects a non-dyeing ink. The dyeing ink contains a disperse dye, a water-soluble organic solvent, and water, and the non-dyeing ink contains a water-soluble organic solvent and water. The water-soluble organic solvent contained in the non-dyeing ink contains a glycol-based organic solvent having a HSP value of 13.6 or more, and the content of the glycol-based organic solvent is 80% by mass or more relative to the total amount of the organic solvent contained in the non-dyeing ink.

An example of the recording apparatus used in the present embodiment is described below with reference to the drawing, but the recording apparatus used in the present embodiment is not limited to a configuration below.

FIGURE shows an example of the recording apparatus used in the present embodiment. FIGURE shows as an example an on-carriage type printer including an ink cartridge mounted on a carriage, but the recording apparatus is not limited to the on-carriage type printer and may be an off-carriage type printer including an ink cartridge fixed on the outside.

The printer used in description below is a serial printer including an ink jet head for recording mounted on a carriage which is moved in a predetermined direction, and the ink jet head is moved with movement of the carriage to eject droplets on a recording medium. The recording apparatus is not limited to the serial printer, and may be a line printer. The line printer is a printer of a type in which an ink jet head is formed to be wider than the width of a recording medium and droplets are ejected on the recording medium without movement of the ink jet head.

In the drawing, the contraction scale of each member is properly changed for making recognizable the size of each member.

As shown in FIGURE, a printer 1 includes an ink jet head 2, an ink cartridge 3, a carriage 4, a platen 5, a heating mechanism 6, a carriage moving mechanism 7, a medium transport mechanism 8, a guide rod 9, a linear encoder 10, and a control unit CONT.

The control unit CONT controls the operation of the whole printer 1. The ink jet head 2 is mounted the carriage 4, which is detachably provided with the ink cartridge 3 which supplies a dyeing ink and a non-dyeing ink to the ink jet head 2. The platen 5 is disposed below the ink jet head 2 and a fabric M as a recording medium is transported to the platen 5. The heating mechanism 6 heats the fabric M. The carriage moving mechanism 7 moves the carriage 4 in the medium width direction of the fabric M. The medium transport mechanism 8 transports the fabric M in the medium feed direction. The medium width direction is a main scanning direction in which the ink jet head 2 is operated. The medium feed direction is a direction perpendicular to the main scanning direction and is a sub-scanning direction in which the fabric M is moved.

The ink jet head 2 is a unit which adheres the dyeing ink and the non-dyeing ink to the fabric M and includes, in a surface opposite to the fabric M to which the dyeing ink is adhered, a first nozzle, which ejects the dyeing ink, and a second nozzle, which ejects the non-dyeing ink. The plurality of nozzles are arranged in a line to form a nozzle surface on a nozzle plate surface.

The system for ejecting the dyeing ink and the non-dyeing ink from the nozzles is, for example, a piezo system in which pressure and a recording information signal are simultaneously applied to the dyeing ink and the non-dyeing ink from a piezoelectric device, thereby ejecting and recording droplets of the dyeing ink and the non-dyeing ink.

In FIGURE, the ink cartridge 3 which supplies the dyeing ink and the non-dyeing ink in to the ink jet head 2 includes independent four cartridges. Three Of the four cartridges are filled with respective different types of dyeing inks, and one is filled with the non-dyeing ink. The ink cartridge 3 is detachably provided on the ink jet head 2. In the example shown in FIGURE, the number of cartridges is 4, but it is not limited to this and a desired number of cartridges can be mounted.

The carriage 4 is mounted in a state of being supported by the guide rod 9 serving as a support member disposed in the main scanning direction, and is moved in the main scanning direction along the guide rod 9 by the carriage moving mechanism 7. In the example shown in FIGURE, the carriage 4 is moved in the main scanning direction, but is not limited to this. The carriage 4 may be moved in the sub-scanning direction in addition to being moved in the main scanning direction.

The installation position of the heating mechanism 6 is not particularly limited as long as it is provided at a position which permits heating of the fabric M. In the example shown in FIGURE, the heating mechanism 6 is installed at a position above the platen 5 so as to face the ink jet head 2. When the heating mechanism 6 is installed at the position facing the ink jet head 2, the position where the dyeing ink and the non-dyeing ink are adhered to the fabric M can be securely heated, and thus the dyeing ink and the non-dyeing ink adhered to the fabric M can be efficiently dried.

Examples of the heating mechanism 6 include a print heater mechanism of heating the fabric M in contact with a heating source, a mechanism of irradiating infrared light, microwaves which are electromagnetic wavers having a maximum wavelength of about 2450 MHz, or the like, a dryer mechanism of spraying hot air, and the like.

The fabric M is heated by the heating mechanism 6 before or when the droplets ejected from the nozzles of the ink jet head 2 are adhered to the fabric M. The heating conditions, for example, the heating timing, heating temperature, heating time, etc., are controlled by the control unit CONT.

From the viewpoint of wetting expansion of the dyeing ink, improvement in permeability and drying properties, ejection stability, etc., The fabric M is heated by the heating mechanism 6 so that the fabric M maintains a temperature range of 35° C. or more and 65° C. or less. The heating temperature of the fabric M represents the surface temperature of a recording surface of the fabric M during heating.

Besides the heating mechanism 6, the printer 1 may include a second heating mechanism not shown in the drawing. In this case, the second heating mechanism is disposed downstream the heating mechanism 6 in the transport direction of the fabric M. The second heating mechanism heats the fabric M after the fabric M is heated by the heating mechanism 6, that is, after the dyeing ink and the non-dyeing ink ejected from the nozzles are adhered to the fabric M, forming an image. Thus, the drying properties of the dyeing ink and the non-dyeing ink adhered to the fabric M are improved. Any one of the mechanisms described for the heating mechanism 6 can be used as the second heating mechanism. The heating by the second heating mechanism is preferably performed so that the fabric M maintains a temperature of 100° C. or more and 200° C. or less.

The linear encoder 10 detects a signal corresponding to the position of the carriage 4 in the main scanning direction. The signal detected by the linear encoder 10 is sent as position information to the control unit CONT. The control unit CONT recognizes the scanning position of the ink jet head 2 based on the position information sent from the linear encoder 10 and controls the recording operation, that is, the ejection operation or the like, of the ink jet head 2. The control unit CONT is configured so that the moving speed of the carriage 4 can be variably controlled.

EXAMPLES

The present disclosure is described in further detail below by using examples and comparative examples. The present disclosure is not limited to the examples below.

1. Preparation of Dyeing Ink

Materials in each of the compositions shown in Table 1 below were mixed and sufficiently stirred to prepare each dyeing ink composition. Specifically, the materials were uniformly mixed and then filtered to remove insoluble materials, thereby preparing each dyeing ink composition. In Table 1 below, the unit of a numerical value is "% by mass", and a total is 100.0% by mass.

TABLE 1

| | | K1 | C1 | M1 | Y1 | R1 | B1 | O1 | O2 |
|---|---|---|---|---|---|---|---|---|---|
| Disperse dye | Disperse Blue 60 | | 4.5 | | | | | | |
| | Disperse Blue 165 | 2.0 | | | | | 2.0 | | |
| | Disperse Yellow 114 | | | | 4.5 | | | | 5.0 |
| | Disperse Yellow 163 | 3.0 | | | | | | | |
| | Disperse Red 92 | | | 4.5 | | | | | |
| | Disperse Red 154 | 2.0 | | | | | | | |
| | Disperse Red 191 | | | | | 6.0 | | | 1.0 |
| | Disperse Orange 80 | | | | | | | 3.0 | |
| Water-soluble organic solvent | 1,3-Butanediol | 19.0 | 19.0 | 19.0 | 19.0 | 19.0 | 19.0 | 19.0 | 19.0 |
| | 1,2-Propanediol | 19.0 | 19.0 | 19.0 | 19.0 | 19.0 | 19.0 | 19.0 | 19.0 |
| | Glycerin | 2.0 | 2.0 | 2.0 | 2.0 | 2.0 | 2.0 | 2.0 | 2.0 |
| Surfactant | Sodium dodecyl diphenyl ether sulfonate | 1.0 | 1.0 | 1.0 | 1.0 | 1.0 | 1.0 | 1.0 | 1.0 |

TABLE 1-continued

|  |  | K1 | C1 | M1 | Y1 | R1 | B1 | O1 | O2 |
|---|---|---|---|---|---|---|---|---|---|
| pH adjuster | Triethanolamine | 0.2 | 0.2 | 0.2 | 0.2 | 0.2 | 0.2 | 0.2 | 0.2 |
| Chelating agent | Disodium ethylenediamine tetraacetate | 0.02 | 0.02 | 0.02 | 0.02 | 0.02 | 0.02 | 0.02 | 0.02 |
| Antiseptic agent | Proxel XL-2 (manufactured by Lonza) | 0.3 | 0.3 | 0.3 | 0.3 | 0.3 | 0.3 | 0.3 | 0.3 |
|  | Water | Balance | Balance | Balance | Balance | Balance | Balance | Balance | Balance |

2. Preparation of Non-Dyeing Ink

Materials in each of the compositions shown in Table 2 below were mixed and sufficiently stirred to prepare each non-dyeing ink composition. Specifically, the materials were uniformly mixed and then filtered to remove insoluble materials, thereby preparing each non-dyeing ink composition. In Table 2 below, the unit of a numerical value is "% by mass", and a total is 100.0% by mass.

TABLE 2

|  |  | HSP value | Standard boiling point | CL-1 | CL-2 | CL-3 | CL-4 | CL-5 | CL-6 |
|---|---|---|---|---|---|---|---|---|---|
| Water-soluble organic solvent | Triethylene glycol | 13.5 | 285 |  |  |  |  | 5.5 |  |
|  | 1,3-Butanediol | 13.6 | 207 | 23.0 | 20.0 |  | 20.0 | 20.0 | 17.0 |
|  | Diethylene glycol | 13.7 | 245 |  |  |  |  |  | 6.0 |
|  | 1,2-Propanediol | 14.2 | 188 | 12.5 | 20.0 |  | 18.5 | 10.0 | 17.0 |
|  | Ethylene glycol | 16.1 | 197 |  |  | 38.0 |  |  |  |
|  | 1,2,3,4-Butanetetrol | 17.8 | 329 |  |  |  | 1.5 |  |  |
|  | 2-Pyrrolidone |  |  |  |  | 2.0 |  |  |  |
| pH adjuster | Triethanolamine |  |  | 0.2 | 0.2 | 0.2 | 0.2 | 0.2 | 0.2 |
| Surfactant | EXP4300 (manufactured by Nissin Chemical Industry Co., Ltd.) |  |  | 0.3 | 0.3 | 0.3 | 0.3 | 0.3 | 0.3 |
| Ureas | Urea |  |  | 15.0 | 5.0 | 10.0 | 15.0 | 15.0 | 5.0 |
| Antiseptic agent | Proxel XL-2 (manufactured by Lonza) |  |  | 0.3 | 0.3 | 0.3 | 0.3 | 0.3 | 0.3 |
|  | Water |  |  | Balance | Balance | Balance | Balance | Balance | Balance |
| Content of glycol-based organic solvent having HSP value of 13.6 or more in organic solvent (% by mass) |  |  |  | 100 | 100 | 100 | 100 | 84.5 | 100 |
| Content of glycol-based organic solvent having HSP value of 13.6 or more and standard boiling point of 243° C. or less in organic solvent (% by mass) |  |  |  | 100 | 100 | 100 | 96.2 | 84.5 | 85 |

Each of the HSP values in Table 2 is a value obtained by calculation using the mathematical formula (1) with reference to the numerical values of $\delta_D$, $\delta_P$, and $\delta_H$ of the database of International Chemical Identifier.

2. Evaluation 2.1. Formation of Printed Fabric

An ink jet textile printing machine "Monna-Lisa Evo T16 180" manufactured by Rebustelli Inc. was filled with the dyeing ink and the non-dyeing ink prepared as described above. A fabric was set in the ink jet textile printing machine, and solid printing was uniformly performed on the fabric in "720×540 D. P. I. three-path" mode so that a coating amount of the dyeing ink per unit area was the condition of applied duty described in Tables 3 to 4, and the non-dyeing ink was adhered so as obtain each of the applied ratios shown in Tables 3 to 4.

After printing, steam treatment was performed at 160° C. for 10 minutes by using a streamer (manufactured by Mathis Inc.; steamer DHe model), followed by water washing. Further, the unadhered dye was removed by washing for 10 minutes with hot water of 80° C. containing 0.2% by mass of Laccol STA (washing aid, manufactured by Meisei Chemical Works, Ltd.), 0.4% by mass of sodium dithionite, and 0.4% by mass of sodium hydroxide. The fabric was further washed with water and then dried, forming a printed fabric.

The following two types were used as the fabric. Fabric 1: Toyobo Spunbond Inc.; emboss-type polyester long fiber nonwoven fabric "Ecule" (registered trade name), product name 3A01A (METSUKE 100 g/m², thickness: 390 μm) Fabric 2: Mitsubishi Paper Mills Limited; diamond spunlace extra-fine polyester-type nonwoven fabric "WO-FE" (METSUKE 60 g/m², thickness: 260 μm)

In printing, each of the fabrics used was previously dipped in an aqueous solution containing 1% by mass of carboxymethyl cellulose and 0.4% by mass of citric acid, squeezed by a mangle, and then dried at room temperature.

In Examples 3, 5, and 8, and Comparative Example 3, the description "C1/M1" of the dyeing ink indicates that equal amounts of cyan and magenta were adhered. For example, with an applied duty of 0.6 mg/cm², "C1/M1" represents that C1 and M1 were adhered at 0.3 mg/cm² each and adhered in a total of 0.6 mg/cm².

2.2. Evaluation of Printed Fabric

In each of the evaluations below, sensory evaluation was made by 10 subjects, and the scores made by the subject were averaged to obtain evaluation results.

2.2.1. Uniformity of Image Density (Dyeing Unevenness)

It was determined by visual observation whether or not a solid printed portion of the printed fabric formed as described above has uniform color development, that is, whether or not dyeing unevenness is present.

Evaluation Criteria 5 points: Uniformity is caused over the whole range and good.

3 points: Uniformly is slightly poor at a level with no practical problem.

1 point: Uniformity is unsatisfactory with somewhat remarkable unevenness.

0 point: Dyeing unevenness can be determined at a glance.

2.2.2. Color Separation

It was determined by visual observation whether color development clearly expressed as one color or color separation occurs at the boundary between a solid printed portion and an unprinted portion of the printed fabric formed as described above.

Evaluation Criteria 5 points: No color separation and monochromatic color development are observed.

3 points: Minute color separation is observed in a portion of the print boundary at a level with no practical problem.

1 point: An outline of a color different from the solid printed portion is observed at the boundary.

0 point: An outline of a color clearly different from the solid portion is observed.

2.2.3. Color Development with Fiber Dropping Off (Image Durability)

A scotch mending tape (MP-24) manufactured by 3M Japan Limited was tightly attached to the solid-printed portion of the printed fabric, and 1 minute after, the tape was peeled to confirm a color development state of the peeled portion.

Evaluation Criteria 5 points: Color development is uniform over the whole with no difference between before and after tape attachment/peeling.

3 points: White fibers are slightly exposed or portions appeared to be fiber sections are exposed at a level with no practical problem.

1 point: The undyed fibers (white) are remarkable.

0 point: Color omission apparently occurs (the white background is clearly exposed in the surface).

TABLE 3

|  |  |  |  | Example 1 |  |  |  |  | Example 2 |  |  |  | Example 3 |  |  |
|---|---|---|---|---|---|---|---|---|---|---|---|---|---|---|---|
|  | Dyeing ink |  |  | K1 |  |  |  |  | C1 |  |  |  | C1/M1 |  |  |
|  | Non-dyeing ink |  |  | CL-1 |  |  |  |  | CL-1 |  |  |  | CL-2 |  |  |
|  | Ratio of non-dyeing ink applied to dyeing ink (% by volume) |  |  | 5 | 30 | 100 | 300 | 500 | 20 | 50 | 200 | 400 | 30 | 100 | 300 |
| Test results | Fabric 1 | Applied Duty 0.6 mg/cm² | Dyeing unevenness | 4.4 | 5 | 5 | 4.4 | 3.8 | 4.8 | 5 | 5 | 4 | 5 | 5 | 4.4 |
|  |  |  | Color separation | 4.4 | 5 | 5 | 4.2 | 3.2 | — | — | — | — | 5 | 5 | 4.2 |
|  |  |  | Durability | 3.2 | 4 | 4.6 | 4.6 | 4.6 | 3.6 | 4.4 | 4.6 | 4.6 | 4 | 4.6 | 4.6 |
|  |  | Applied Duty 0.3 mg/cm² | Dyeing unevenness | 3.6 | 4.2 | 4.8 | 4.4 | 3.8 | 4 | 4.8 | 4.8 | 4.4 | 4.2 | 4.6 | 4.2 |
|  |  |  | Color separation | 3.6 | 4.6 | 4.8 | 4.2 | 3.6 | — | — | — | — | 4 | 4.6 | 4.2 |
|  |  |  | Durability | 3 | 4 | 4.4 | 4 | 3.4 | 3.2 | 3.8 | 3.6 | 3.4 | 3.4 | 3.8 | 3.4 |
|  | Fabric 2 | Applied Duty 0.6 mg/cm² | Dyeing unevenness | 3.6 | 5 | 5 | 5 | 4.2 | 4.2 | 5 | 5 | 4.6 | 5 | 5 | 4.6 |
|  |  |  | Color separation | 4 | 5 | 5 | 4 | 3 | — | — | — | — | 5 | 5 | 4 |
|  |  |  | Durability | 3.8 | 4.4 | 5 | 5 | 5 | 4.2 | 5 | 5 | 5 | 4.4 | 5 | 5 |
|  |  | Applied Duty 0.3 mg/cm² | Dyeing unevenness | 3.2 | 4.2 | 4.8 | 4.4 | 4.4 | 3.8 | 4.4 | 4.6 | 4.4 | 4.2 | 4.6 | 4.4 |
|  |  |  | Color separation | 3.6 | 4.4 | 4.8 | 4.2 | 4 | — | — | — | — | 4.4 | 4.6 | 4 |
|  |  |  | Durability | 3.2 | 4 | 4.4 | 4 | 4 | 4 | 4.2 | 4.4 | 4 | 4 | 4.4 | 4.2 |

|  |  |  |  | Example 4 |  |  | Example 5 |  |  | Example 6 |  |  | Example 7 |  |  |
|---|---|---|---|---|---|---|---|---|---|---|---|---|---|---|---|
|  | Dyeing ink |  |  | B1 |  |  | Y1/R1 |  |  | O1 |  |  | O2 |  |  |
|  | Non-dyeing ink |  |  | CL-2 |  |  | CL-3 |  |  | CL-3 |  |  | CL-3 |  |  |
|  | Ratio of non-dyeing ink applied to dyeing ink (% by volume) |  |  | 30 | 100 | 300 | 30 | 100 | 300 | 30 | 100 | 300 | 30 | 100 | 300 |
| Test results | Fabric 1 | Applied Duty 0.6 mg/cm² | Dyeing unevenness | 5 | 5 | 4.4 | 5 | 5 | 4.2 | 5 | 5 | 3.8 | 5 | 5 | 4.4 |
|  |  |  | Color separation | — | — | — | 5 | 5 | 4.2 | — | — | — | 5 | 5 | 4.6 |
|  |  |  | Durability | 3.4 | 4.4 | 4.6 | 4.2 | 4.6 | 4.4 | 3.4 | 4.4 | 4.4 | 3.8 | 4.6 | 4.6 |
|  |  | Applied Duty 0.3 mg/cm² | Dyeing unevenness | — | — | — | — | — | — | — | — | — | — | — | — |
|  |  |  | Color separation | — | — | — | — | — | — | — | — | — | — | — | — |
|  |  |  | Durability | — | — | — | — | — | — | — | — | — | — | — | — |

TABLE 3-continued

| | | | | | | | | | | | | | | |
|---|---|---|---|---|---|---|---|---|---|---|---|---|---|---|
| Fabric 2 | Applied Duty 0.6 mg/cm² | Dyeing unevenness | 5 | 5 | 5 | 5 | 5 | 4.6 | 5 | 5 | 4.4 | 5 | 5 | 4.6 |
| | | Color separation | — | — | — | 5 | 5 | 3.8 | — | — | — | 5 | 5 | 4.2 |
| | | Durability | 3.8 | 5 | 5 | 4.6 | 5 | 5 | 4 | 5 | 5 | 4.2 | 5 | 5 |
| | Applied Duty 0.3 mg/cm² | Dyeing unevenness | — | — | — | — | — | — | — | — | — | — | — | — |
| | | Color separation | — | — | — | — | — | — | — | — | — | — | — | — |
| | | Durability | — | — | — | — | — | — | — | — | — | — | — | — |

TABLE 4

| | | | Example 8 | | | Example 9 | | | Example 10 |
|---|---|---|---|---|---|---|---|---|---|
| | Dyeing ink | | C1/M1 | | | K1 | | | B1 |
| | Non-dyeing ink | | CL-4 | | | CL-5 | | | CL-6 |
| | Ratio of non-dyeing ink applied to dyeing ink (% by volume) | | 30 | 100 | 300 | 30 | 100 | 300 | 30 |
| Test results | Fabric ① | Applied Duty 0.6 mg/cm² | Dyeing unevenness | 5 | 5 | 3.8 | 4.4 | 4.2 | 4.2 | 4.2 |
| | | | Color separation | 4 | 4.4 | 3.4 | 3.8 | 4 | 3.6 | — |
| | | | Durability | 3.6 | 4.4 | 4.6 | 3 | 3.4 | 3.4 | 3 |
| | | Applied Duty 0.3 mg/cm² | Dyeing unevenness | — | — | — | — | — | — | — |
| | | | Color separation | — | — | — | — | — | — | — |
| | | | Durability | — | — | — | — | — | — | — |
| | Fabric ② | Applied Duty 0.6 mg/cm² | Dyeing unevenness | 5 | 5 | 4.2 | 4.6 | 4.4 | 4.4 | 4.6 |
| | | | Color separation | 3.8 | 4.4 | 3 | 3.2 | 4 | 3.2 | — |
| | | | Durability | 4.6 | 5 | 5 | 3 | 3.6 | 3.8 | 3 |
| | | Applied Duty 0.3 mg/cm² | Dyeing unevenness | — | — | — | — | — | — | — |
| | | | Color separation | — | — | — | — | — | — | — |
| | | | Durability | — | — | — | — | — | — | — |

| | | | Example 10 | | Comparative Example 1 | Comparative Example 2 | Comparative Example 3 |
|---|---|---|---|---|---|---|---|
| | Dyeing ink | | B1 | | K1 | C1 | C1/M1 |
| | Non-dyeing ink | | CL-6 | | — | — | — |
| | Ratio of non-dyeing ink applied to dyeing ink (% by volume) | | 100 | 300 | — | — | — |
| Test results | Fabric ① | Applied Duty 0.6 mg/cm² | Dyeing unevenness | 4.4 | 4.2 | 2.6 | 2.6 | 2.6 |
| | | | Color separation | — | — | 3 | — | 2.6 |
| | | | Durability | 3.6 | 3.8 | 1.4 | 1.4 | 1.4 |
| | | Applied Duty 0.3 mg/cm² | Dyeing unevenness | — | — | 2.6 | 2.8 | 2.4 |
| | | | Color separation | — | — | 2.6 | — | 2.8 |
| | | | Durability | — | — | 1.6 | 1.6 | 1.6 |
| | Fabric ② | Applied Duty 0.6 mg/cm² | Dyeing unevenness | 4.6 | 4.6 | 2.6 | 2.8 | 2.6 |
| | | | Color separation | — | — | 2.6 | — | 2.4 |
| | | | Durability | 3.8 | 4.2 | 1.4 | 1.6 | 1.4 |
| | | Applied Duty 0.3 mg/cm² | Dyeing unevenness | — | — | 2.2 | 2.4 | 2.6 |
| | | | Color separation | — | — | 2.2 | — | 2.4 |
| | | | Durability | — | — | 1.6 | 1.6 | 1.6 |

2. Evaluation Results

It was found that even when a nonwoven fabric containing synthetic fibers is recorded, it is possible to suppress dyeing unevenness and color separation and improve the durability of a printed matter by using the predetermined non-dyeing ink described above.

What is claimed is:

1. A textile printing method for printing a fabric, which is a nonwoven fabric containing synthetic fibers, the method comprising:
   - a first adhering step of adhering to the fabric by ejecting a dyeing ink by an ink jet method; and
   - after the first adhering step, a second adhering step of adhering a non-dyeing ink to the fabric,
   - wherein the dyeing ink contains a disperse dye, a water-soluble organic solvent, and water;
   - the non-dyeing ink contains a water-soluble organic solvent and water;
   - the water-soluble organic solvent contained in the non-dyeing ink contains a glycol-based organic solvent having a HSP value of 13.6 or more that is at least one selected from the group consisting of 1,3-propannediol, 1,3-butanediol, 1.2-propanediol, 1,4-butanediol, 2-butyn-1,4-diol, trimethylolpropane, 1,2,3-butanetriol, and 1,2,3,4-butanetetrol;
   - the content of the glycol-based organic solvent is 85% by mass or more relative to the total amount of the organic solvent contained in the non-dyeing ink;
   - the adhesion position of the dyeing ink and the adhesion position of the non-dyeing ink are at least partially overlapped each other; and
   - an amount of the non-dyeing ink adhered to the fabric is in the range of 0.1 to 1.5 mg/cm$^2$.

2. The textile printing method according to claim 1, wherein the standard boiling point of the glycol-based organic solvent is 243° C. or less.

3. The textile printing method according to claim 1, wherein the HSP value of the glycol-based organic solvent is 17.0 or less.

4. The textile printing method according to claim 1, wherein the dyeing ink contains two or more types of disperse dyes.

5. The textile printing method according to claim 1, wherein two or more inks containing different coloring materials are used as the dyeing ink.

6. The textile printing method according to claim 1, wherein two or more selected from the group consisting of a yellow ink, a magenta ink, a red ink, a cyan ink, a blue ink, and an orange ink are used as the dyeing ink.

7. The textile printing method according to claim 1, wherein in a region where the dyeing ink and the non-dyeing ink are adhered to be overlapped each other, the amount of the non-dyeing ink adhered relative to 100% by volume of the dyeing ink adhered is 10% to 400% by volume.

8. The textile printing method according to claim 7, wherein in a region where the dyeing ink and the non-dyeing ink are adhered to be overlapped each other, the amount of the non-dyeing ink adhered relative to 100% by volume of the dyeing ink adhered is 50% to 200% by volume.

9. A recording apparatus used for the textile printing method according to claim 1, the apparatus comprising:
   - an ink jet head having a first nozzle that ejects the dyeing ink and a second nozzle that ejects the non-dyeing ink.

* * * * *